Figure 1:
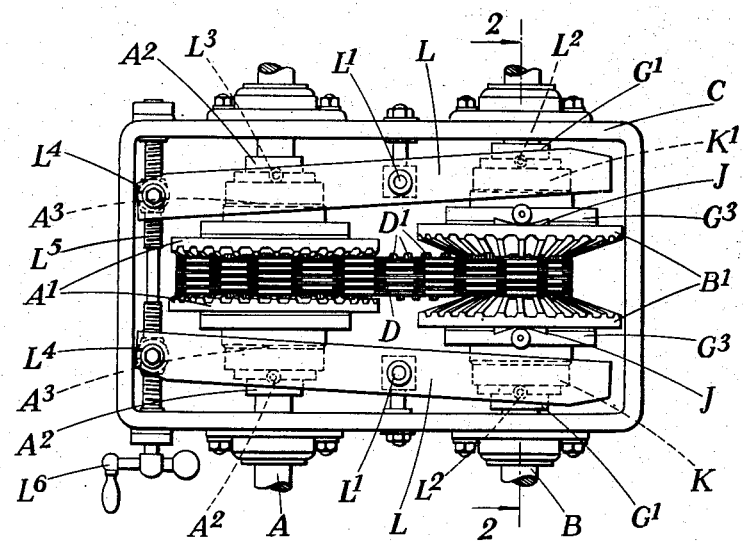

Jan. 26, 1937.  G. J. ABBOTT  2,068,784

TRANSMISSION MECHANISM OF THE V-PULLEY TYPE

Filed Aug. 5, 1935  2 Sheets-Sheet 1

INVENTOR.
G. J. Abbott.
BY
Blair Kilburne
ATTORNEYS.

Patented Jan. 26, 1937

2,068,784

UNITED STATES PATENT OFFICE 2,068,784

TRANSMISSION MECHANISM OF THE V-PULLEY TYPE

Geoffrey Joseph Abbott, London, England, assignor to P. I. V. Chain Gears Limited, London, England, a company of Great Britain Application August 5, 1935, Serial No. 34,821
In Great Britain August 17, 1934

4 Claims. (Cl. 74—230.17)

This invention relates to transmission mechanism of the V-pulley type, that is to say transmission mechanism including a pulley having two radial flanges the adjacent faces of which are formed so that they lie closer together adjacent to the axis of rotation than adjacent to their outer circumferential edges and a chain, belt or other cooperating transmission member a part of which lies between and engages the pulley flanges.

Such transmission mechanism may be used to transmit power at a substantially constant ratio in which case the pulley flanges are maintained at a fixed axial distance from one another or may be used in variable ratio transmission mechanism in which case the pulley flanges are movable axially towards and away from one another to permit the cooperating transmission member to engage parts of the flange lying respectively further from or nearer to the axis of rotation, thus varying the effective diameter of the pulley.

When the cooperating transmission member is in the form of a chain or belt it may extend between two such pulleys the flanges of one of which can be separated as those of the other are brought towards one another, or vice versa, so as to vary the transmission ratio and one such form of variable speed transmission mechanism is described in the specification of the present applicant's United States of America Patent No. 1,601,662.

In transmission mechanism of the kind referred to there is a wedging action between the cooperating transmission member and the pulley flanges which, in the case of chain or belt gearing, is maintained by the tension in the chain or belt and it has been proposed to provide means for adjusting or maintaining this tension either by moving one pulley towards or away from the other bodily, by adjusting the pulley flanges independently of the adjustment effected for the purpose of ratio variation or by means of slippers or riders which are caused by a spring or springs to bear on the parts of the chain or belt between the pulleys so as to tend to draw these parts together and so maintain the belt or chain in tension, such tension means allowing not only for stretching of the chain or belt due to wear but also in some cases serving to take up slack which would otherwise occur in the chain or belt at certain settings of the pulleys.

Such prior proposals require periodic inspection and adjustment and in the case of spring-controlled slippers or riders the effective force of the springs diminishes as the riders or slippers move in to take up slack so that the greater the slack, the less the effective force of the springs acting on the riders to take up this slack. Moreover, such prior proposals had to be arranged so that the tension in the chain or belt was maintained at all times sufficient for the condition when maximum load was being transmitted with the result that at smaller loads it was in excess of that necessary and thus tended to cause unnecessary wear.

The object of the present invention is to provide an improved arrangement of transmission mechanism of the kind referred to in which the wedging action of the flanges of the pulley or pulleys will be controlled in such a manner as, in the case of belt or chain gearing, to maintain the correct tension in the belt or chain to suit all running conditions.

To this end in transmission mechanism of the V-pulley type according to the present invention there is combined with a V-pulley a rotary member which is coaxial with the pulley and is adapted to receive the drive from or to transmit it to the pulley through an operative driving connection such that the reaction in this driving connection due to the transmission of power between the rotary member and the pulley not only causes the pulley and rotary member to rotate together but also tends to move the pulley flanges towards one another. It will thus be seen that the wedging action of the pulley flanges on the belt, chain or other cooperating transmission member is determined by and varies with the transmission of power and that the arrangement can therefore be such that at all diameters substantially the correct wedging action and hence tension in the belt or chain for the existent driving conditions is automatically maintained.

Preferably there is combined with the operative driving connection resilient means tending always to move the pulley flanges towards one another irrespective of whether power is being transmitted or not, these resilient means serving to cause the pulley flanges to exert the required wedging action and thus to maintain the belt or chain at the correct tension during periods when little or no power is being transmitted and during periods when, due to reversal of torque, the driving connection might instantaneously be inoperative to maintain the desired wedging action. In one arrangement the resilient means may comprise a series of helical springs arranged around the axis of rotation of the pulley with their ends acting respectively on a pulley flange and on the rotary member and with such an arrangement the length, diameter and other dimensions of the springs are preferably such that when relative rotation takes place between the pulley and the rotary member to the limited extent permitted by the operative driving connection, such relative rotation resulting in one end of each spring being somewhat circumferentially displaced from its other end, the tangential component of the thrust exerted by the springs on the adjacent pulley flange and the rotary member due to this lack of alignment will be substantially counterbalanced by the opposite tangential thrust due to the ends of the springs tending to return into alignment.

Preferably, however, in place of providing springs arranged as described above, there is combined with the flanges of the V-pulley one or more coupling members which are held from rotation relatively to the pulley flanges and each of which is connected to or acts at one end on one pulley flange while its other end passes freely through the other flange and constitutes or carries a thrust member for one end of a spring the other end of which acts on the outer face of the flange adjacent thereto so as to tend to move the pulley flanges towards one another. Thus, there is at no time any relative rotation between the flange on which one end of the spring acts and the abutment member on which its other end acts. In such an arrangement a plurality of coupling members are conveniently provided spaced around the axis of rotation of the pulley, each coupling member comprising a rod or bar the opposite ends of which pass freely through slots respectively in the bores of the flanges while the ends of the coupling members are formed to constitute or carry thrust members one of which serves as a thrust member for the outer end of one or more springs interposed between it and the outer face of its adjacent flange, while the other either acts as or carries a thrust member for a spring or springs similarly interposed between it and its adjacent flange or acts on the outer face of its adjacent flange without the interposition of a spring or springs.

The operative driving connection may be arranged in various ways but preferably there is combined with the pulley flange and the rotary member a series of ramps or cams on one of these parts each having a face inclined to the plane of rotation, and cooperating members carried by or formed on the other part so as to act on the cam faces and thus transmit power between said parts, whereupon the tendency for the cooperating members to ride up the cam faces tends to force the pulley flange away from the rotary member and hence towards the other pulley flange. Conveniently each ramp or cam on one part comprises two oppositely inclined surfaces between which lies a roller or the like carried by the other part so that, whichever the direction of power transmission, the roller or the like engages one of the inclined surfaces and thus tends to force the adjacent pulley flanges towards the other pulley flange.

The invention may be applied to transmission mechanism of the type comprising two V-pulleys with a chain or belt extending between them, of the fixed ratio or variable ratio type and in either case may be applied to one or to each of the pulleys. When applied to transmission mechanism of the variable ratio type means may be provided for positively moving the rotary member or members axially to effect changes in the effective diameter of the pulley or each pulley, apart from any small changes which may occur automatically due to operation of the positive driving connection to maintain the belt or chain in tension.

Alternatively, means may be provided for controlling at will, for example manually, the effective diameter of one pulley in which mechanism according to the invention may be incorporated or not, while the other pulley includes mechanism according to the invention which maintains the chain in tension in spite of changes produced in the effective diameter of the first pulley by the manual or other control mechanism.

In any case, the extent of automatic adjustment of which mechanism according to the invention is capable is preferably sufficient to maintain the tension in the chain throughout its useful life, i. e. until it is due for renewal due to stretch or wear.

Further, although it is usually convenient to arrange the operative driving connection so that it acts on the pulley flange at a point either adjacent to its outer circumference or displaced somewhat inwardly therefrom, this operative driving connection may also act on the part of the pulley flange or a member thereon adjacent to the axis of rotation. In fact, the distance from the axis of rotation at which the operative driving connection acts on the pulley flange may be selected as desired to suit requirements, as may be the form of the operative driving connection.

Figure 2:
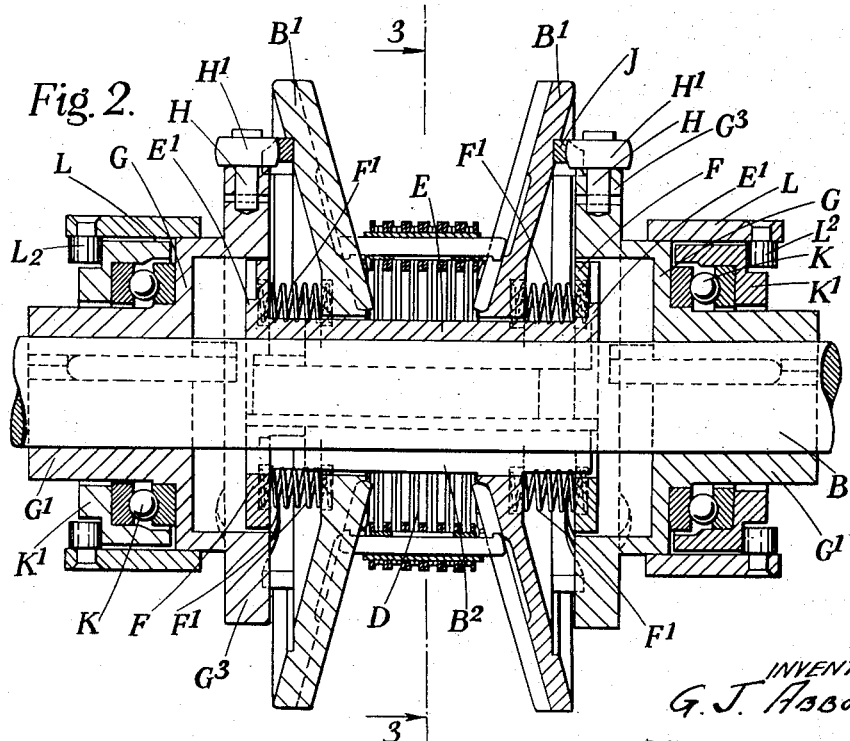
Figure 3:
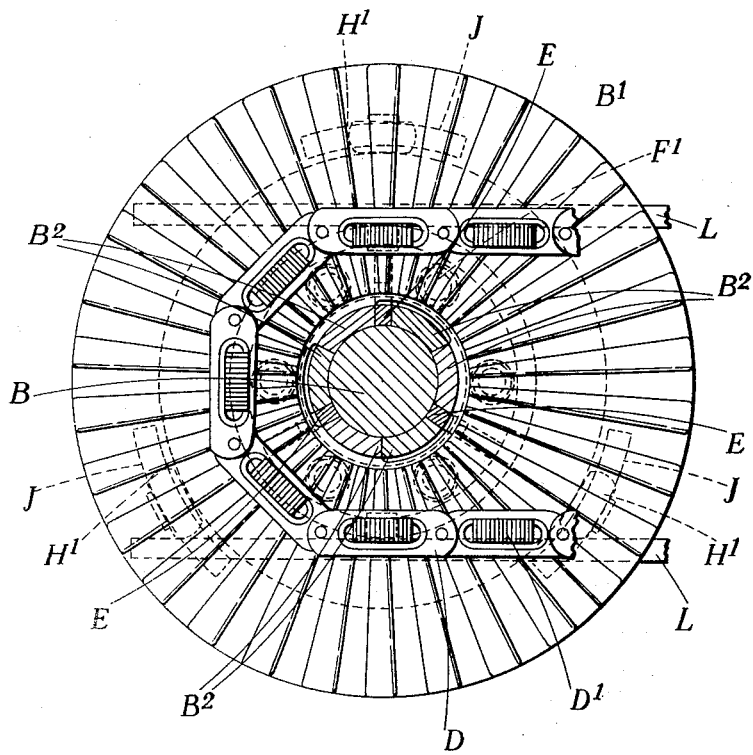
Figure 4:
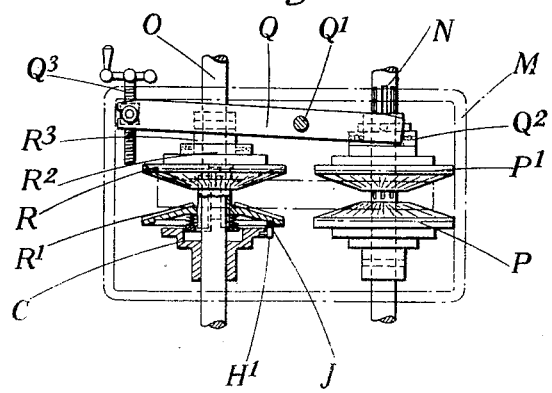

The invention may be carried into practice in various ways but two alternative constructions according to the invention as applied to a variable ratio transmission gear of the kind forming the subject of United States of America Patent No. 1,601,662 are illustrated by way of example in the accompanying drawings, in which Figure 1 is a plan view of one form of variable speed gear according to the invention, Figure 2 is a section on the line 2—2 of Figure 1, Figure 3 is a section on the line 3—3 of Figure 2, and Figure 4 is a plan view showing somewhat diagrammatically an alternative form of variable speed gear according to the invention.

In the construction illustrated in Figures 1, 2 and 3, the variable speed gear comprises a driving shaft A and a driven shaft B supported parallel to one another in bearings in a casing C. Carried by the driving and driven shafts are V-pulleys the flanges of which are designated by the reference letters $A^1$ and $B^1$ respectively and are each provided with a series of radial depressions separated by radial ribs or projections, as shown, the arrangement being such that each projection on one flange of a pulley lies opposite to a correspondingly dimensioned depression in the other flange of the pulley, as described, for example, in the specification of United States of America Patent No. 1,601,662. The flanges $A^1$, $A^1$ of the pulley on the driving shaft A are mounted, for example, on splines on the shaft A so as to be movable axially along the shaft but not rotatable relatively thereto and surrounding the driving shaft A are two thrust collars $A^2$ which can act through thrust bearings indicated at $A^3$ on the flanges to cause axial movement thereof along the shaft A in a manner generally known.

The pulleys are connected by a transmission member D which lies between the pulley flanges and is in the form of a chain comprising a support carrying a series of slat-like members indicated at $D^1$ adapted to move upon the support in a direction transverse to the length of the chain to form what may be termed compound teeth of variable pitch, the number of elements in each tooth being capable of variation to suit the dimensions of the recesses in the pulley flanges whatever portion of the pulley flanges is engaged by the chain, this chain being formed, for example, as described in the specification of the present applicant's United States of America Patent No. 1,601,663.

The pulley constituted by the flanges $B^1$ has associated with it mechanism according to the present invention and to this end this pulley is constructed and arranged as more particularly shown in Figures 2 and 3. Thus, each pulley flange $B^1$ is formed integral with or rigidly mounted on a tubular sleeve which is free to rock on the shaft and has a series of longitudinal slots in which can slide the parts between the longitudinal slots in the tubular sleeve on the other flange. Thus each tubular sleeve may be regarded as comprising a series of axially extending fingers or splines $B^2$ which are separated by the slots and can lie and slide in the slots in the other sleeve. As shown, the axially extending fingers $B^2$ constituting one sleeve have a width measured circumferentially which is somewhat less than the circumferential width of the slots in the other sleeve so as to leave a longitudinally extending gap between one side of each finger and the adjacent side of the next finger. Arranged in each of the gaps is a coupling member E in the form of a rod of approximately rectangular cross-section relatively to which the axially extending fingers $B^2$ can slide longitudinally but which substantially fills the gap so as to prevent any relative rotational movement between the pulley flanges $B^1$. The ends of the coupling members E extend as shown and lie outside the pulley flanges $B^1$ and are provided with projections $E^1$ which extend radially outwards with respect to the axis of rotation. The projections on the ends of the coupling members E adjacent to each flange serve as abutments for an annular thrust member F between which and the outer face of the adjacent flange is inserted a series of helical springs $F^1$ spaced around the axis of rotation and seating at their ends in circular recesses in the annular thrust member F and the outer face of the adjacent flange $B^1$.

It will be seen that with this arrangement the spring or springs tend always to move the flanges $B^1$ towards one another.

Mounted to slide axially but not to rotate on the shaft B are two rotary driving members G each of which is associated with one of the flanges $B^1$ and comprises a hub-like part $G^1$ keyed to but slidable axially along the shaft B and carrying a disc-like part $G^3$ in which is formed three radial bores each constituting a support for the inner end of a spindle H on which is rotatably mounted a roller $H^1$. Each of the rollers $H^1$ has associated with it and acts upon a ramp or cam J rigidly mounted on the outer face of the adjacent flange $B^1$, the ramps J having two oppositely inclined surfaces, as shown in Figure 1, so that when relative angular movement tends to take place between a member $G^3$ and its adjacent pulley flange, the action of the rollers $H^1$ on the ramps J tend to move the pulley flange away from the member $G^3$.

Mounted on each of the parts $G^1$ is a thrust bearing K acted upon by a thrust collar $K^1$.

Means are provided for moving the pulley flanges $A^1$ and $B^1$ towards and away from one another in such a manner that as the flanges $B^1$ approach one another the flanges $A^1$ are moved apart, and vice versa, for the purpose of varying the transmission ratio as between the pulleys constituted by the flanges $A^1$ and $B^1$. To this end two levers L are mounted to rock about pivots $L^1$ within the casing C, each of these levers carrying adjacent to one of its ends a roller $L^2$ which acts on the adjacent thrust collar $K^1$ while it carries adjacent to its other end a roller $L^3$ which acts on the adjacent thrust collar $A^2$. The levers L carry at their lefthand ends in Figure 1 nut members indicated at $L^4$ which engage respectively left- and right-hand screwthreads on a rotatable shaft $L^5$ adapted to be rotated by a handle $L^6$.

It will thus be seen that by rotating the handle $L^6$ the levers L can be rocked about the pivots $L^1$ to cause the thrust members $K^1$ to move towards one another as the thrust members $A^2$ are permitted to move apart, and vice versa, these thrust members acting through the appropriate thrust bearings on the flanges $B^1$ and $A^1$ to cause corresponding movement of these flanges.

Whatever the relative positions of the flanges $B^1$, however, it will be seen that power is transmitted from these flanges to the shaft B through the ramps J, rollers H and the members G and that the action of the rollers $H^1$ on the ramps J due to the transmission of power therebetween will tend to force the pulley flanges $B^1$ towards one another to grip the transmission member D. The formation of the operative surface of the cam members J is such that, whatever the power being transmitted, the force with which the rollers $H^1$ acting through the ramps J tend to move the flanges $B^1$ towards one another is sufficient to maintain substantially the correct tension in the chain and it will be seen that this force will vary with the power being transmitted so that substantially the correct tension in the chain can be maintained under all working conditions. The springs $F^1$ on the other hand serve to cause the flanges $B^1$ to exert the required wedging action and thus maintain the chain at the correct tension during periods when little or no power is being transmitted and during the periods when, due to reversal of torque, the interconnection between the rollers $H^1$ and cams J might instantaneously be inoperative to maintain this wedging action.

Figure 4 shows somewhat diagrammatically an alternative form of variable speed gear of a simple character incorporating the present invention.

In this construction the variable speed gear comprises a casing M in which is supported a driving shaft N and a driven shaft O parallel thereto. The driving shaft N carries a pulley comprising a flange P rigidly mounted on the shaft and a flange $P^1$ mounted, for example, on splines so as to be slidable but not rotatable on the shaft and having associated with it mechanism for moving it towards and away from the flange P at will. This mechanism comprises, for example, a lever Q pivoted at $Q^1$ and acting at one end through a thrust bearing $Q^2$ on the pulley flange $P^1$ and at its other end acted upon by a screw and nut control device indicated at $Q^3$. The shaft O carries a second pulley having flanges R, $R^1$. The flanges R, $R^1$ are provided with interengaging axially extending fingers similar to the fingers $B^2$ of the flanges $B^1$ in the construction shown in Figures 1, 2 and 3 and also have associated therewith coupling members similar to the members E in the construction shown in Figures 1, 2 and 3 so that the flanges are free to rock on the shaft O and to move axially but not to rotate relatively to one another. Associated with the coupling members are also thrust members and springs similarly arranged to the thrust members and springs F, F¹ in the construction shown in Figures 1, 2 and 3 so that the springs tend always to move the flanges R, R¹ towards one another.

The flange R is positively held from axial movement on the shaft O, for example, by a thrust bearing indicated at R² interposed between the flange and a collar R³ rigidly connected to the shaft O. The flange R¹, on the other hand, has mounted on its outer face ramp members J similar to the members J in the construction shown in Figures 1, 2 and 3 upon which act rollers H¹ mounted on a member G arranged in a similar manner to the corresponding members in the construction shown in Figures 1, 2 and 3, the member G being, however, rigidly connected to the shaft, while the ramps J are longer than the corresponding ramps in the construction shown in Figures 1, 2 and 3 and have operative surfaces which are capable of causing greater relative movement between the parts G and R¹ than the relative movement between the parts G and B¹ which can be produced by the ramps J to the construction shown in Figures 1, 2 and 3.

The operation of the variable speed gear shown in Figure 4 is as follows. The adjustment of the ratio of transmission is effected solely by movement of the flange P¹ by means of the lever Q controlled by the control handle Q³, and corresponding movement of the flange R¹ takes place automatically by reason of the automatic adjusting mechanism constituted by the springs and the members J, H¹ and G. Thus, as will be appreciated, this mechanism always tends to maintain the wedging action on the chain correct and thus to maintain the chain at the correct tension so that when such tension is increased due to movement of the flange P¹ towards the flange P, the flange R¹ will automatically be moved by the increased wedging action of the chain on the flanges R¹ and R away from the flange R. Similarly, when the flange P¹ is moved away from the flange P thus tending to reduce the tension in the chain, the flange R¹ will automatically move towards the flange R to maintain this tension. Further, at all times the tension in the chain will be dependent upon the power being transmitted between the pulley R, R¹ and the shaft O through the mechanism J, H¹, G while the springs will maintain the necessary tension when little or no power is being transmitted or when the mechanism J, H¹, G might instantaneously be inoperative to maintain the tension due to reversal of torque.

What I claim as my invention and desire to secure by Letters Patent is:—

1. Transmission mechanism of the V-pulley type including, in combination, a V-pulley having separate flanges relatively movable away from and towards one another, the bores of said flanges being slotted, a transmission member lying between and engaging the inner faces of the flanges, a rotary member for transmission of power to or from the pulley, said rotary member being arranged coaxially with the pulley, an operative driving connection between the pulley and the said rotary member adapted to cause the pulley and the rotary member to rotate together and exert a force dependent upon the power being transmitted tending to move the pulley flanges towards one another, a plurality of coupling members spaced around the axis of rotation of the pulley, each comprising a rod the opposite ends of which pass freely through slots in the bores of the flanges, thrust members on the ends of said coupling members, and a spring interposed between at least one of the thrust members and its adjacent flange while the other thrust member acts on the outer face of its adjacent flange.

2. Transmission mechanism of the V-pulley type including, in combination, a V-pulley having two flanges, a sleeve rigidly mounted on each flange and extending towards the other flange and having formed therein a plurality of longitudinal slots in which lie and can slide the parts between the corresponding slots in the sleeve of the said other flange, said slots being formed to provide also longitudinal grooves in the adjacent parts of said sleeves, coupling members arranged in said grooves with their ends extending through the bores of the pulley flanges, thrust members on the ends of said coupling members, a spring interposed between at least one of the thrust members and the outer face of the adjacent flange adapted to force the flanges towards one another, a shaft on which the pulley is free to rotate, a rotary member held against rotation on the shaft, and an operative driving connection between the pulley and the said rotary member causing the pulley to rotate with the said rotary member and exerting a force dependent on the power being transmitted tending to move the pulley flanges towards one another.

3. Transmission mechanism of the V-pulley type including, in combination, a V-pulley having two flanges, a sleeve rigidly mounted on each flange and extending towards the other flange and having formed therein a plurality of longitudinal slots in which lie and can slide the parts between the corresponding slots in the sleeve of said other flange, the slots providing also longitudinal grooves between adjacent parts of the sleeves, coupling members arranged in said grooves with their ends extending through the bores of the pulley flanges, thrust members on the ends of the coupling members, at least one spring interposed between each thrust member and the outer face of the adjacent flange and tending to force the flanges towards one another, a shaft on which the pulley is free to rotate, a rotary member held against rotation on said shaft, and an operative driving connection between one of the pulley flanges and the rotary member comprising a series of cams on one of these members, each cam comprising two oppositely inclined surfaces, and rollers carried by the other member and lying between the two oppositely inclined surfaces of a cam to act on one or the other of these surfaces according to the direction of transmission of power whereby the rollers and cams cause the pulley flanges to rotate with the rotary member and exert a force dependent on the power being transmitted tending to move the flanges towards one another.

4. Transmission mechanism of the V-pulley type including, in combination, a V-pulley having separate flanges movable away from and towards one another, a transmission member lying between and engaging the inner faces of the flanges, means including a rotary member for transmission of power to or from the pulley, said member being coaxial with and lying to one side of said pulley with a part thereof lying adjacent to the radial outer face of one of said flanges, an operative driving connection between the rotary member and the adjacent pulley flange comprising a series of cams on the exposed face of one of these members each including two oppositely inclined surfaces, and cooperating parts carried by the other member and lying between the two oppositely inclined surfaces of the cam to act on one or other of these surfaces, whichever the direction of transmission of power and capable of moving from engagement with the other, means including a thrust member positively held from movement relatively to the pulley flanges about the axis of these flanges, an abutment rigid with the thrust member and situated adjacent to the outer face of one of the flanges, and at least one spring interposed between the abutment and the adjacent flange.

GEOFFREY JOSEPH ABBOTT.